United States Patent
Manson et al.

(10) Patent No.: US 7,343,932 B2
(45) Date of Patent: Mar. 18, 2008

(54) MULTIPLE LINE ADMINISTRATION

(75) Inventors: Ronald James Manson, Spring, TX (US); Russell Eric McBeth, The Woodlands, TX (US)

(73) Assignee: Cameron International Corporation, Houston, TX (US)

( * ) Notice: Subject to any disclaimer, the term of this patent is extended or adjusted under 35 U.S.C. 154(b) by 404 days.

(21) Appl. No.: 10/842,116

(22) Filed: May 10, 2004

(65) Prior Publication Data

US 2005/0236050 A1    Oct. 27, 2005

Related U.S. Application Data

(63) Continuation-in-part of application No. 10/833,901, filed on Apr. 27, 2004.

(51) Int. Cl.
    *F16K 11/074* (2006.01)
(52) U.S. Cl. .............. 137/625.11; 137/236.1
(58) Field of Classification Search ........... 137/625.11, 137/625.46, 874, 236.1, 876; 251/129.04
    See application file for complete search history.

(56) References Cited

U.S. PATENT DOCUMENTS

| | | | |
|---|---|---|---|
| 825,370 A | 7/1906 | Zurbuch | |
| 1,556,407 A | 10/1925 | Bottcher | |
| 2,391,196 A | 12/1945 | Sanderson | |
| 2,821,998 A | 2/1958 | Mayhew | |
| 2,835,273 A | 5/1958 | McDonald | |
| 2,840,109 A | 6/1958 | Wadleigh | |
| 2,996,083 A | 8/1961 | Huska | |
| 3,246,667 A | 4/1966 | Pemberton | |
| 3,536,098 A * | 10/1970 | Cunningham | ............... 137/876 |
| 3,545,474 A | 12/1970 | Brown | |
| 3,545,489 A | 12/1970 | Brown et al. | |
| 3,581,768 A * | 6/1971 | Conti | ........................ 137/874 |
| 3,674,123 A | 7/1972 | Lewis et al. | |

(Continued)

FOREIGN PATENT DOCUMENTS

WO    WO 02/20938    * 3/2002

OTHER PUBLICATIONS

Bettis Actuators & Controls, "Multiport Flow Selector".

(Continued)

*Primary Examiner*—John Rivell
(74) *Attorney, Agent, or Firm*—Fletcher Yoder (57) ABSTRACT

A system for connecting multiple pipe lines includes a plurality of multi-port selector valves. Each valve includes a valve body having an inlet port module that includes a body adapted to connect to a fluid source and an outlet port module having a body with at least two outlet ports. Each of the outlet ports may connect to an outlet fluid destination. A port selector rotatably disposed in the valve body includes a rotatable member having a flow path there through that has a path inlet and a path outlet. The path outlet has a second flow direction substantially parallel to said first flow direction with an angle of less than 90 degrees to the first flow direction. An offset portion disposed between the first flow direction and the second flow direction has a longitudinal flow direction. An outlet valve line is adapted to connect one of the at least two outlet ports of a first valve of the plurality of valves to the inlet port of another of the plurality of valves.

22 Claims, 9 Drawing Sheets

U.S. PATENT DOCUMENTS

| | | |
|---|---|---|
| 3,780,756 A | 12/1973 | Pennington |
| 4,133,418 A | 1/1979 | Van Bilderbeek |
| 4,207,922 A | 6/1980 | Andrieux et al. |
| 4,366,839 A | 1/1983 | Slavin |
| 4,372,337 A | 2/1983 | Holzenberger |
| 4,396,036 A | 8/1983 | Horikawa et al. |
| 4,523,606 A | 6/1985 | Gould et al. |
| 4,807,662 A | 2/1989 | Verne |
| 4,886,401 A | 12/1989 | Andrews et al. |
| 4,989,641 A | 2/1991 | Jones et al. |
| 5,046,522 A | 9/1991 | Le Devehat et al. |
| 5,127,429 A | 7/1992 | Kempf et al. |
| 5,188,151 A | 2/1993 | Young et al. |
| 5,261,451 A | 11/1993 | Spencer |
| 5,656,090 A | 8/1997 | Preston et al. |
| 5,862,833 A | 1/1999 | Perez |
| 5,927,330 A | 7/1999 | Minton et al. |
| 6,000,430 A | 12/1999 | Nafz |

OTHER PUBLICATIONS

Ring-O Valve, "3-Way Subsea Forged Body Ball Valve".
FMC Energy System, "Poppet Diverter Valves".
NU-CON, "Rotary Tube Selector Valves".
Republic Catalog, "Rockwell-Nordstrom Class B Iron and ANSI Steel Multiport Lubricated Plug Valves".
"Framo Multiport Selector Manifold for Topside and Subsea Applications".
Oil States Industries, "Onshore Oil and Gas Land," copyright 2002-2004.
International Search Report with Written Opinion, dated Jul. 6, 2005, for PCT/US2005/009430.
International Search Report with Written Opinion, dated Jul. 6, 2005, for PCT/US2005/009609.

* cited by examiner

MULTIPLE LINE ADMINISTRATION

This application is a continuation-in-part of the U.S. application Ser. No. 10/833,901 entitled "In-Line Multi-Port Selector Valve" filed on Apr. 27, 2004, having inventors Ronald James Manson and Russell Eric McBeth, assigned to Dresser, Inc.

TECHNICAL FIELD

This invention relates to valves, and more particularly to multi-port valves.

BACKGROUND

Valves have a variety of applications in numerous industries. In the production of oil and natural gas, valves are a necessity in any operation due to the need for directing the flow of fluids (gas, water, and oil) between wells, pumps, vessels, and refineries. In general, oil and gas development includes well drilling, production (bringing fluids to the surface), treating the various mixtures of oil and gas, and the transportation to oil refineries and gas sales points. Many production fields consist of numerous wells producing fluids comprising natural gas, oil and water individually, simultaneously, or collectively. Generally, the fluids from the wells are transported to a central collection or gathering station to combine or further separate them for subsequent aspects of development, such as refining, gas sales, etc. Accordingly, the production of each well is generally directed to a manifold system that communicates the well products to various testing and/or production destinations upon production. Additionally, the numerous destinations for materials require the use of a myriad of valves and pipe systems to direct flow to a desired location.

Using multi-port valves is well known. However, most multi-port valves are designed to have multiple inlets and a single outlet. Additionally, most multi-port systems direct the flow from an opening through a chamber with selectively opened and closed outlets for fluid. The use of these multi-port valves allows multiple inputs to be directed to a single destination. Though appropriate for some applications, the multi-outlet valves operate only to direct fluid to a single destination, absent additional piping and valve systems.

In addition to gathering production fluids from wells, often different types of fluids or other matter is required to be sent down into the well. For example, treating solutions to dissolve terrestrial rock formations and scale compounds must be directed down-hole to facilitate production. Additionally, pipe scrapers, commonly known as pipeline "pigs" may be required to be propelled through the piping systems to the wells by pressurized fluid flow to remove scale and debris that can limit production rates. Each pipeline pig requires a launcher and a receiver. In prior art, the piping configuration necessary to support pigging operations is normally extensive. A need exists for a more compact multi-flow system in offshore, environmentally sensitive or industrial plant settings where space is a premium.

SUMMARY

A multi-port selector valve allows for a single opening to communicate with multiple outlets. In oil and gas production and testing operations, the requirement to change the direction of fluid flow from a source is often present. Additionally, without a multi-port selector valve, large networks of piping must be implemented that allow for a branched flow wherein each branch is required to have its own valve to stop or start the flow from the branch to the destination.

A multi-port selector valve reduces the space and complexity of piping networks in various applications. In one implementation, a multi-port selector valve includes a valve body having an inlet port module and an outlet port module. A port selector that includes a flow path is rotatably disposed in the valve body. The flow path includes a path inlet, a path outlet, and an offset portion disposed between the path inlet and path outlet. The path inlet has a flow direction substantially parallel to an outlet flow direction, and the offset portion has an angle less than 90 degrees to the path inlet's flow direction.

A method for directing flow includes providing a valve body with an inlet port module and an outlet port module, a port selector with a flow path disposed there through, and a rotation power source for rotating the port selector. The flow path includes a path inlet with a first direction of flow, a path outlet with a second direction of flow, and an offset portion disposed between the path inlet and path outlet, within the offset portion has longitudinal flow direction with an angle of less than 90° to the second flow direction.

A system for connecting multiple pipe lines includes a plurality of multi-port selector valves. Each valve includes a valve body having an inlet port module that includes a body adapted to connect to a fluid source and an outlet port module having a body with at least two outlet ports. Each of the outlet ports may connect to an outlet fluid destination. A port selector rotatably disposed in the valve body includes a rotatable member having a flow path there through that has a path inlet and a path outlet. The path outlet has a second flow direction substantially parallel to said first flow direction with an angle of less than 90 degrees to the first flow direction. An offset portion disposed between the first flow direction and the second flow direction has a longitudinal flow direction. An outlet valve line is adapted to connect one of the at least two outlet ports of a first valve of the plurality of valves to the inlet port of another of the plurality of valves.

Implementations of the valve provide various advantages. For example, valves manufactured or provided in accordance with implementations of the invention may reduce the necessary space for piping applications. This is particularly advantageous on offshore production platforms or sensitive environmental areas where space is a premium. Additionally, certain implementations allow for more efficient flow transfer from one output location to another.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Described in more detail below is a multi-port selector valve having one inlet and multiple outlets or one outlet and multiple inlets. Though numerous embodiments and implementations are shown, it should be understood that many additional embodiments and implementations may be used in accordance with the teachings of the present invention. For the purposes of this application, the term "fluid" includes oil, gas, water, or any other matter either individually or in any combination. Other matter may include, but is not limited to entrained solids, suspended solids, and slurries of solids.

Figures 1A, 1B:
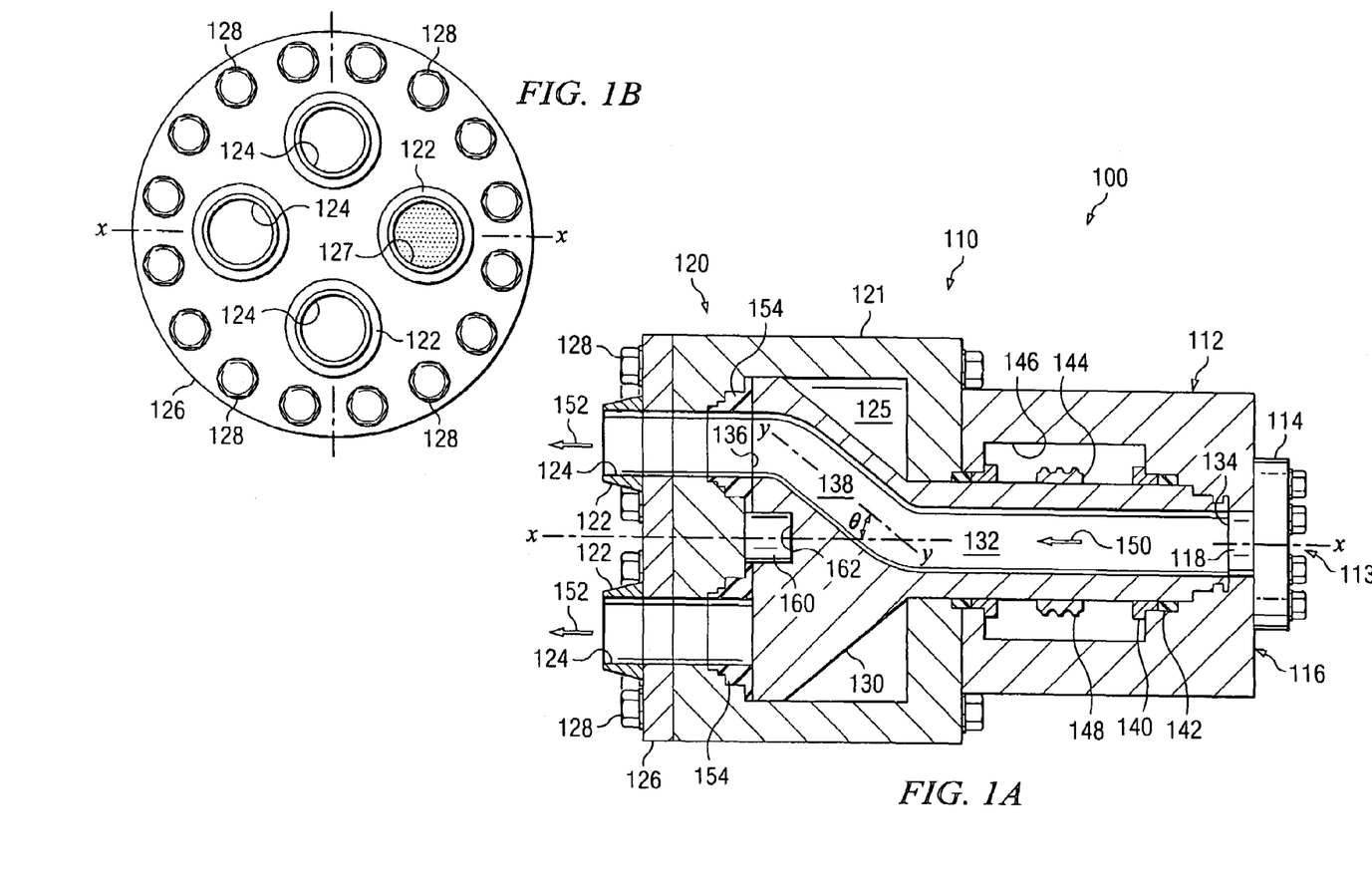
FIG. 1A is a cutaway plan view of a 4-way valve in accordance with an embodiment of the present invention.
FIG. 1B is an end view of the valve of FIG. 1A.

Referring to FIGS. 1A and 1B, a valve system 100 includes a body 110. In the embodiment shown, the body 110 includes an inlet port module 112, an outlet port module 120, and a port selector 130. The inlet port module 112 has an inlet port body 116 adapted to connect to a fluid source through an inlet port flange 114. The inlet port body 116 may be adapted to partially enclose the port selector 130. In the embodiment shown, the inlet port body 116 includes an open yoke 146. The port selector 130 is coupled to the inlet port body 116 via bushings 140. Seals 142 may also be included to prevent fluid entering or exiting the inlet port module 112 from leaking out of the valve body 116.

The inlet port flange 114 has an opening 113 that allows fluid to enter the valve body 110. The inlet port body 114 may also include a bearing 118 for rotatably coupling the path inlet body 114 to the port selector 130.

The outlet port module 120 includes an outlet port body 121 and a plurality of welded outlet ports 122 formed in an outlet plate 126. The four welded outlet ports 122 are shown as welded outlet ports 122, but any suitable type of outlet port may be used. Welded outlet ports 122 define outlets 124. The welded outlet ports 122 may be adapted to be coupled to fluid destinations (not explicitly shown), and each outlet port 122 may be spaced radially outward from the central axis of the port selector, herein labeled the "X-X" axis. Outlet plate 126 is attached to the outlet port module 120 using fasteners 128. The fasteners 128 may be any suitable type of fastener, such as a screw, bolt, nut and bolt assembly, or other suitable fastener.

The port selector 130 may be a rotatable member that includes a flow path 132 formed within, such that the flow path 132 may allow the transfer of fluid from the opening 113 to one of the plurality of outlets 124. The port selector 130 is disposed within the valve body 110 such that it passes through portions of the inlet port module 112 and the outlet port module 120. The flow path 132 formed within the port selector 130 has a path inlet 134, a path outlet 136, and an offset portion 138. Offset portion 138 includes a longitudinal flow direction Y-Y that preferably defines an angle $\theta$ of less than 90 degrees from the central longitudinal axis X-X, so that the flow path 130 may be operable to provide communication between the opening 113 and one of the plurality of outlets 124. The offset portion 138 is angled so that as the port selector 130 is rotated within the valve body 110, the path outlet 136 may be aligned with one of the plurality of outlets 124. Additionally, a blinded outlet 127 may be formed in the endplate 126 such that when the path outlet 136 is aligned with the blinded outlet 127, no fluid may exit the valve system 100.

An advantage of the offset portion 138 having an angle $\theta$ less than 90 degrees is that certain operations, such as launching or receiving a pipe scraper through the valve system 100, are possible. A pipe scraper, or pipe line "pig" as they are commonly referred to in the petroleum industry, is routinely propelled through the pipes from a pipe line launcher in production operations by using pressurized fluid as a propellant. Additionally or alternatively, the pipeline scraper could be coupled to a pipeline scraper receiver. In accordance with the present invention, the smaller the angle $\theta$, the less the amount of resistance a pipe scraper, or pipe line "pig" encounters when passing through the valve. Accordingly, an angle $\theta$ of greater than 90 degrees may be prohibitive in certain applications. The pipeline scraper may be propelled from the launcher or toward the receiver using a pressurized fluid source.

Other advantages of having a longitudinal flow path with an $\theta$ angle of less than 90° to the first flow path include minimizing scale and paraffin deposition in the flow path due to minimizing pressure drop in the offset position 138; minimizing erosion of the internal walls of the flow path in the offset portion 138; and reducing the likelihood of cavitation in the offset portion 138.

In the embodiment shown, an actuator coupling 144 is disposed circumferentially about the port selector 130. In the configuration illustrated by FIG. 1A, the open yoke 146 allows rotational energy to be transmitted from a rotation power source (not shown) via a chain, belt, gear, or other suitable connector to engage the teeth 148 of the actuator coupling 144. As the port selector 130 is rotated within the valve body 110, the path outlet 136 may be aligned with one of the plurality of outlets 124 defined by the welded outlet ports 122 formed in the end plate 126. This alignment allows fluid to pass through open outlets 124 or be stopped by a blinded outlet 127.

In the embodiment shown, the port selector 130 is operable to align the flow path 132 with one of four outlets 124, although in other embodiments, there may be more or less than four outlets 124 formed within the outlet port module 120. Additionally, outlet seals 154 may be coupled to welded outlet ports 122 to ensure a positive connection with the flow path 132 when the flow path 132 is aligned with the outlet port 122. The path inlet 134 has a first direction of flow 150 that is substantially parallel with the central longitudinal "X-X" axis. The path outlet 136 has a second direction of flow 152 that is substantially parallel to the first direction of flow 150 but offset from the central X-X axis.

The multi-port selector valve 100 also includes a trunnion 160 adapted to rotatably couple the port selector 130 to the outlet port module body 121. The trunnion pin 160 may be either adapted to insert into corresponding pin recess 162 formed in a portion of the outlet port module body 121 and a port selector recess 164 formed in the port selector 130. Alternatively, the trunnion pin may be formed integrally with either the port selector 130 and adapted to be inserted in the pin recess 162 or as part of the outlet port module body 121 and inserted into the port selector recess 164. Additionally, the outlet seals 154 may be adapted to provide pressure against the port selector 130, in order to maintain the relative position of the port selector 130 within the valve body 110, and/or to maintain the alignment between the flow path 132 and one of the plurality of outlets 124. The outlet seals 154 may be installed with one or more than one of the outlet ports 122. In one implementation, an outlet seal 154 may provide sealing properties that provide a seal to the outlet port(s) 122 with which it installed and/or provide a seal preventing pressure within the valve body 110 from entering into outlet port(s) 122.

Figure 2:
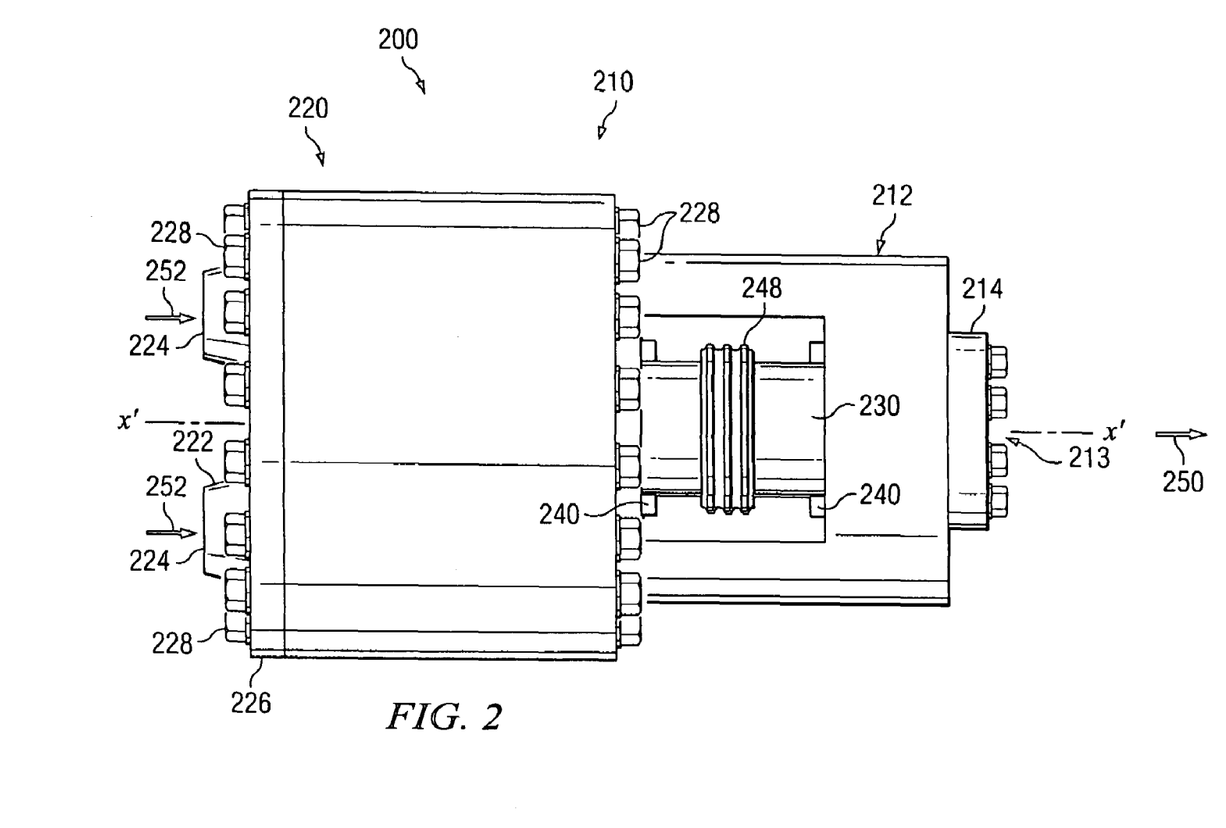
FIG. 2 is a plan view of a valve having a reversed direction of flow.

FIG. 2 illustrates an enclosed valve system 200 having a central longitudinal "X'-X'" axis and having substantially corresponding features of the valve illustrated by FIGS. 1A and 1B. Valve system 200 includes an embodiment in which the outlet port module and inlet port modules are reversed from the configuration illustrated by FIGS. 1A and 1B. For example, in FIG. 2, the outlet port module 120 is replaced by inlet port module 220, which includes a plurality of inlet ports 222 adapted to be coupled to a fluid source, and openings 224 formed in end plate 226. Each of the openings 224 may be adapted to correspond with a first direction of flow 252 substantially parallel to the central longitudinal X'-X' axis of the valve body 210.

Fasteners 228 may be used to couple the end plate 226 to the inlet port module 220, as well as the inlet port module 220 to the outlet port module 212. Additionally, the embodiment shown includes an outlet flange 214 with an outlet 213 formed there through. The outlet flange 214 may be adapted to couple the valve system 200 to an associated fluid destination (not explicitly shown). The outlet 213 corresponds to a second direction of flow 250, which is substantially parallel to the first direction of flow 252. Also not shown is the flow path formed within the port selector 230 that is adapted to communicate between one of the plurality of openings 224 and the outlet 213 when the flow path, similar to the one depicted at reference number 132 of FIG. 1A, is rotatably aligned with one of the plurality of openings 224.

Additionally, in the embodiment shown, but not necessary to the operation of the invention, the second direction of flow is shown to be centered substantially about the central longitudinal X'-X' axis of the valve body.

As stated above, most features of the valve system 200 are analogous to those of valve system 100 as depicted in FIGS. 1A and 1B. As such, the valve system 200 also includes an actuator coupling 240 that includes teeth 248 that, when coupled to an actuator, is operable to rotate the port selector 230 so that the flow path not shown, may be aligned with one of the plurality of openings 224.

Figures 3A, 3B:
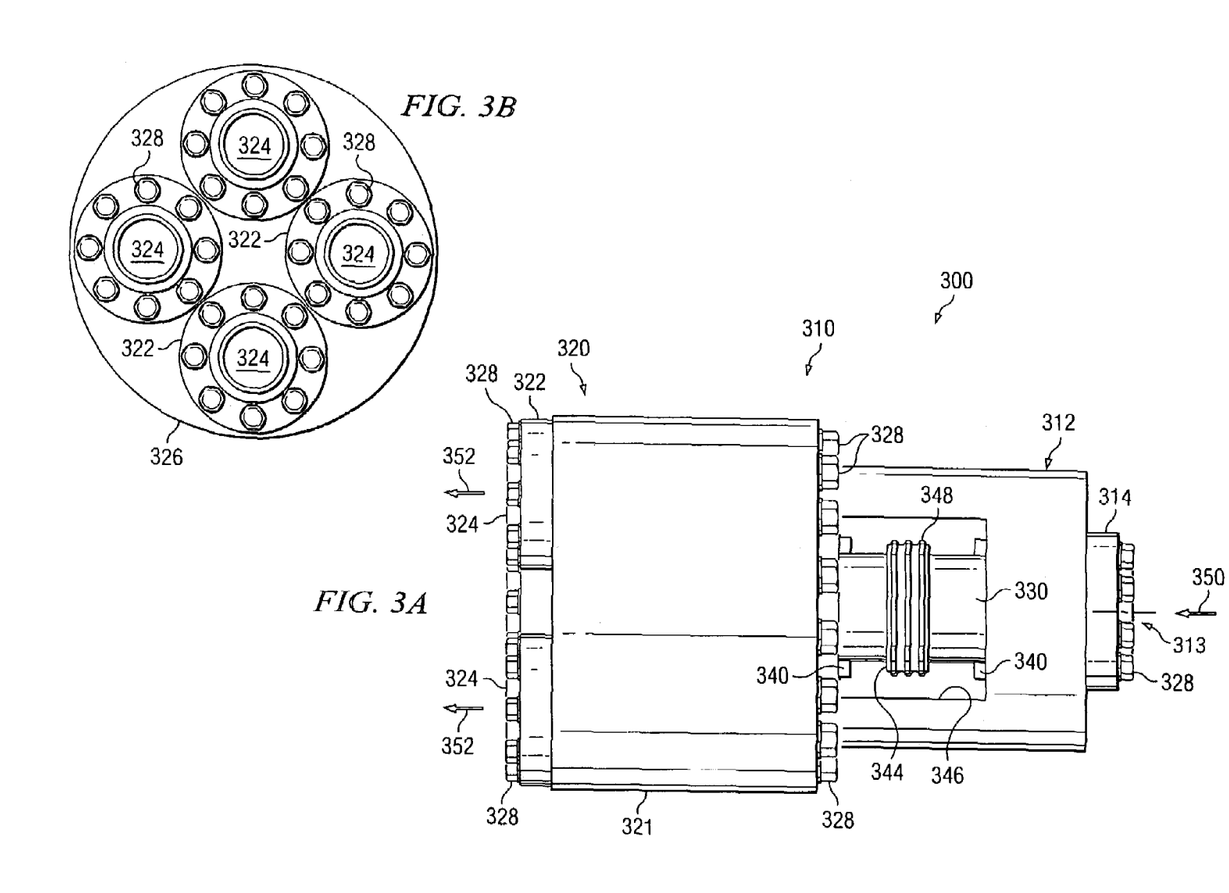
FIG. 3A is a cutaway plan view of a 4-way valve that includes flanged outlets.
FIG. 3B is an end view of the valve of FIG. 3A.

FIGS. 3A and 3B illustrate an alternate embodiment of a valve system 300. The major difference as illustrated by FIGS. 3A and 3B is that the valve system 300 does not include an end plate. Rather, the valve system 300 includes flanged outlet ports 322. Each of these flanged outlet ports 322 may be coupled to the outlet port module body 321 by using fasteners 328, such as bolts, rivets, or other suitable fasteners. Similar to the valve system 100 of FIGS. 1A and 1B, the valve system 300 includes outlets 324 adapted to direct fluid passing through the valve system 300 to a fluid destination. The fluid or other matter enters the valve system 300 through an opening 313 defined by an inlet flange 314 coupled to the inlet port module body 316 of the inlet port module 312. The valve body 310 may be assembled by using fasteners 328 to couple the outlet port module body 321 of the outlet port module 320 to the inlet port module body 316 of the inlet port module 312. Additionally, the port selector 330 may have actuator coupling 344 having teeth or gears 348 disposed within an open yoke 346 disposed within the inlet port module body 312. Upon transmission of rotational energy via a gear, chain, belt or other suitable connection to the actuator coupling 344, the port selector 330 will rotate a flow path formed within the port selector 330 similar to that shown at number 132 of FIG. 1A, to align the path outlet (also not shown) with one of the plurality of outlets 324.

Figures 4A, 4B:
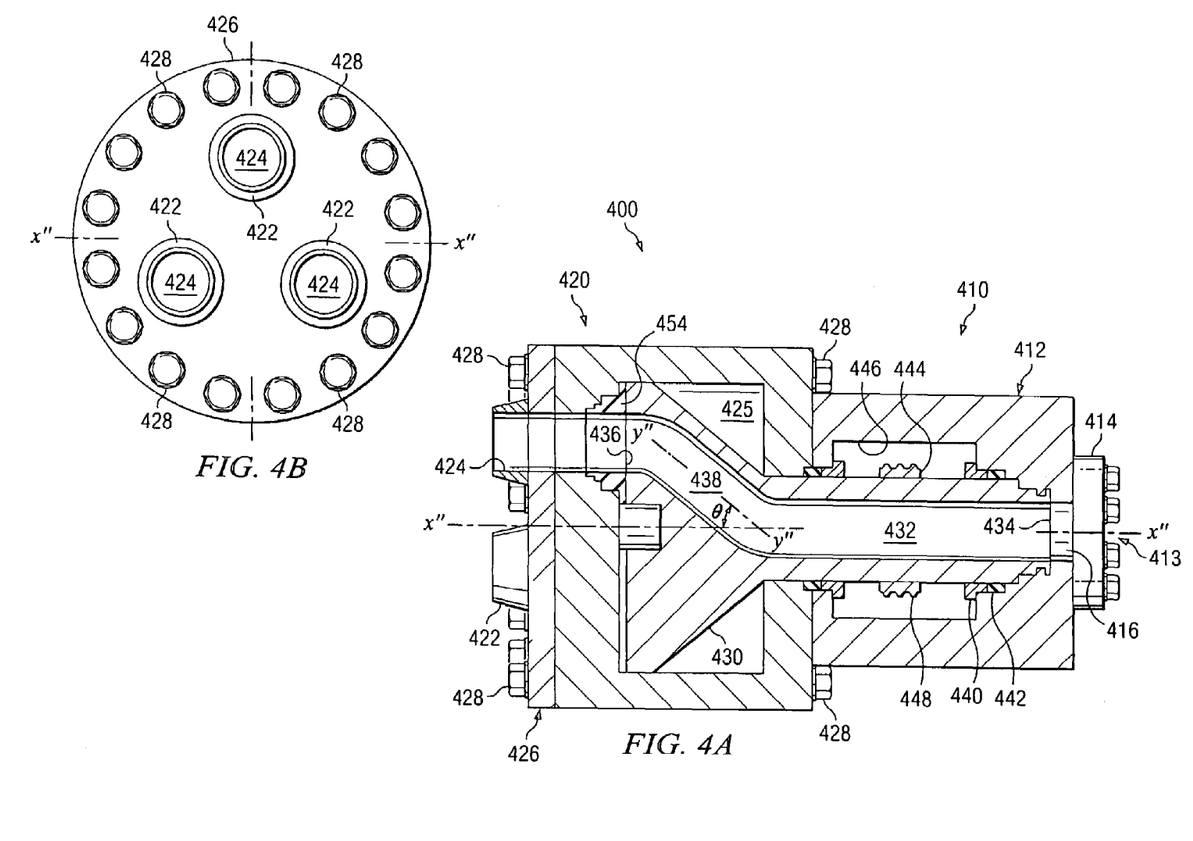
FIG. 4A is a cutaway plan view of a 3-way valve with welded outlets.
FIG. 4B is an end view of the valve of FIG. 4A.

FIGS. 4A and 4B illustrate an alternative multi-port valve system 400 that includes three outlets 424 defined by the welded outlet ports 422 formed in the end plate 426 of the outlet port module 420. Additionally, no trunnion pin is present in the embodiment shown in FIG. 4A. According to this embodiment, the pressure of the fluid moving through the flow path 432 provides the necessary pressure along an axis X"-X" to maintain pressure of the port selector 430 against the valve seat 454 when the flow path 432 is aligned with one of the three outlets 424. Similar to the embodiment shown in FIG. 1A, the flow path 432 includes a path inlet 434 and a bearing 416 to rotatably couple the port selector 430, including the flow path 432 with the inlet flange 414 and the opening 413, respectively. The flow path 432 also has an offset portion 438 that includes a longitudinal flow direction Y"-Y" that preferably defines an angle θ of less than 90 degrees from the central longitudinal axis X"-X" so that the flow path is able to provide communication between the opening 413 and one of the plurality of outlets 424.

In one implementation illustrated in FIG. 4A, an actuator may be located within a closed yoke 446 to provide rotation of the actuator coupling 444. Seals 442 and bushings 440 may also be provided to ensure that the port selector 430 is maintained in proper physical relation to the valve body 410, and/or that no pressurized fluid enters the closed yoke 446 of the inlet port module 410.

Figures 5A, 5B:
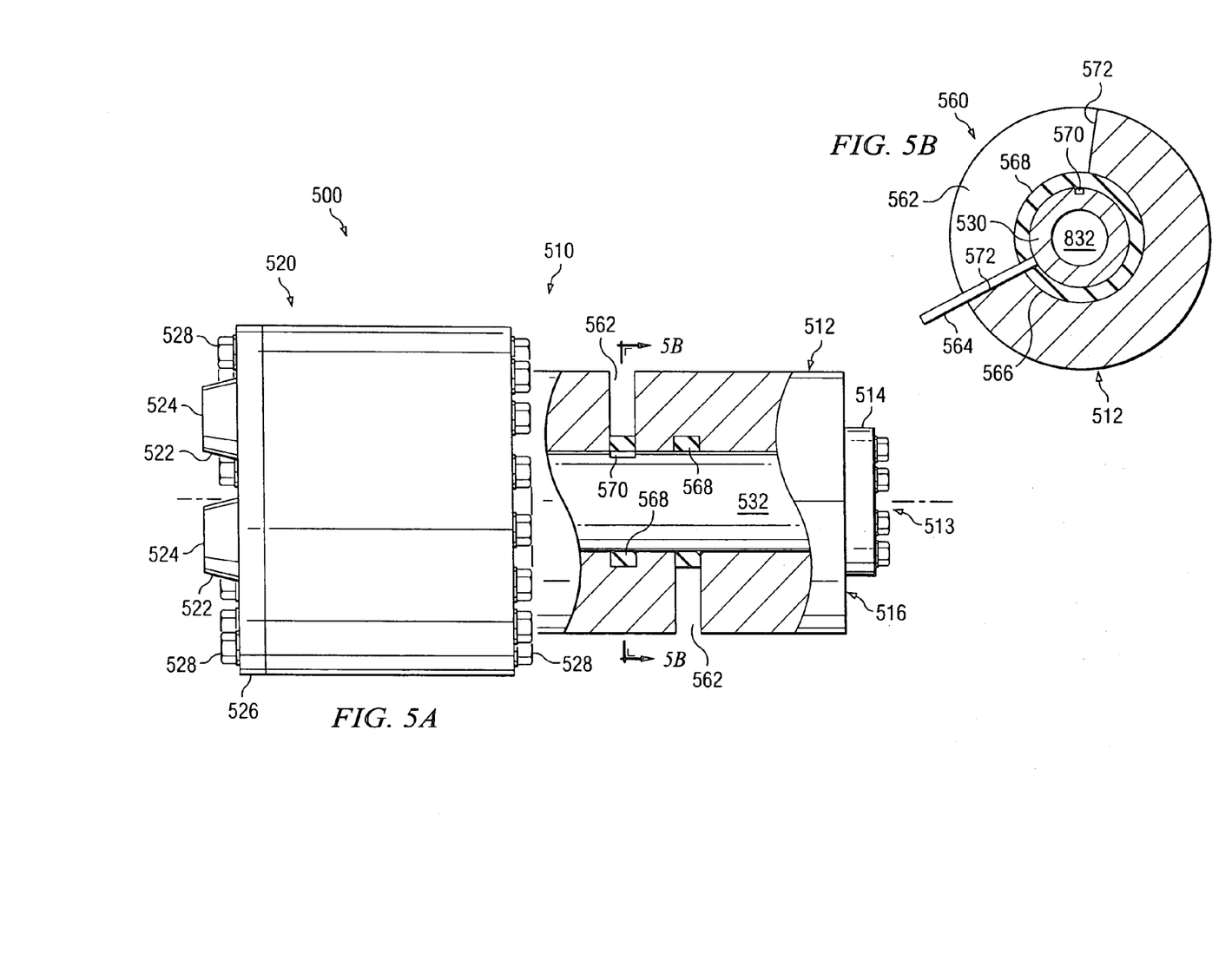
FIG. 5A is a cutaway plan view of a 3-way valve with a manual lever-type actuator.
FIG. 5B is a cross-sectional view of the valve of FIG. 5A along the line A-A'.

FIGS. 5A and 5B illustrate an in-line valve system 500 that allows manual manipulation of the port selector 530 by a lever system 560. The lever system 560 is best described in conjunction the cross section shown by FIG. 5B. The cross section A-A' of FIG. 5B illustrates one or more port recesses 562 formed in the valve body 510 of the valve system 500. An actuator ring 568 may be disposed circumferentially about the port selector 530 that includes a lever recess 566 adapted to receive a lever 564. Upon inserting the lever 564 into the recess 566, a user can rotate the port selector 530 within the valve body 510 to align the flow path 532, which is formed in the port selector 530 in a similar fashion as the flow path 132 of FIG. 1A, to align the path outlet (not explicitly shown) with one of the plurality of outlets 524 defined by the welded outlet ports 522 of the outlet port module 520.

A key 570 may also be included. As depicted, the key 570 may couple the port selector 530 to the actuating ring 568. When the port selector 530 is rotated so that the flow path is aligned with one of the plurality of outlets 522, one of two port recess surfaces 572 in any port recess 562 engages the lever 564 to stop the rotation of the port selector 530 and therefore the flow path 532. The lever system 560 allows a user to manually rotate the flow path 532 of the port selector 530 so that the flow path 532 communicates between the opening 513 defined by the inlet flange 514 of the inlet port module 512 and the outlet 524 defined by the outlet port 522 formed in the end plate 526.

Multiple port recesses 562 may be formed in a given valve body 510. Where multiple port recesses 562 are present, the lever 564 may be removed from a first lever recess 566 in the actuator ring 568 and inserted into a second or subsequent lever recess 566 in the actuator ring 568 to allow further manual rotation of the port selector 530.

Figure 6A:
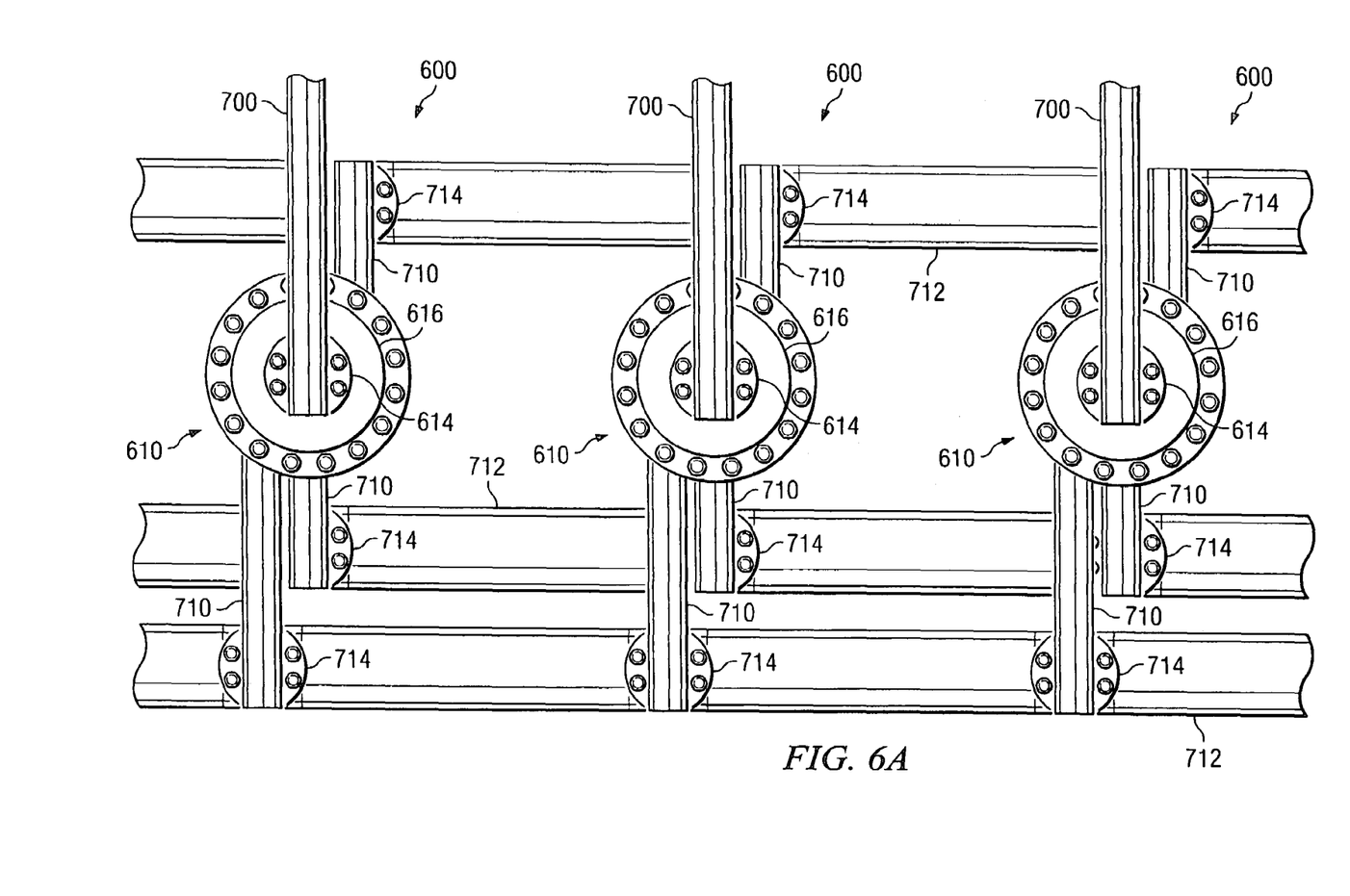
FIG. 6A is a plan view of a manifold system that incorporates one or more valves in accordance with embodiments of the present invention.
Figure 6B:
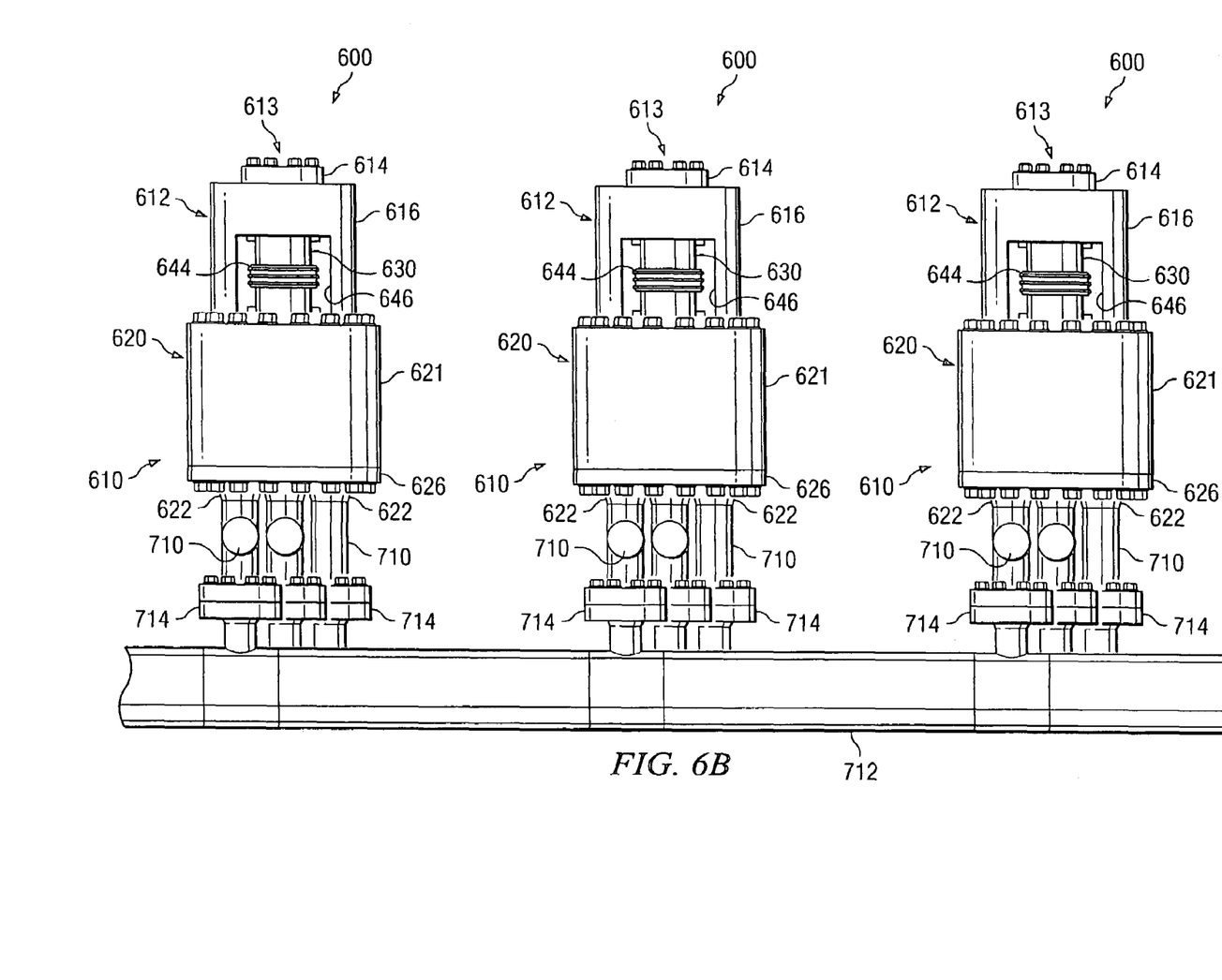
FIG. 6B is a side view of the manifold system depicted in FIG. 6A.

FIGS. 6A and 6B illustrate a manifold system 600 that incorporates a valve similar to that shown in the valve system 100 of FIG. 1A. The system 600 includes a valve body 610 with an inlet port module 612 and an outlet port module 620. Outlet ports 622 are adapted to be coupled to outlet pipes 710. In the embodiment shown, outlet pipes 710 are coupled to destination flanges on destination pipes 712 to transport fluid or other matter transported through the valve body 610. Opening 613 is formed in inlet flange 614 and is adapted to be coupled to inlet pipe 700 to allow fluid to enter the valve body 610 through the opening 613.

The port selector 630 is disposed within the valve body 610 to allow the selective manipulation of the fluid passing through the manifold system 600. For example, an actuator coupling 644 disposed about the port selector 630 may be acted upon by an external actuating means, such as a gear, belt, chain, or other suitable actuating means, so that the port selector 630 and a flow path formed there through (not explicitly shown) may be aligned with one of the plurality of outlet ports 622 to allow the communication of fluid or other matter from the opening 613 via the inlet pipe 700 through the manifold system 600 to a destination pipe 712.

Figure 7A:
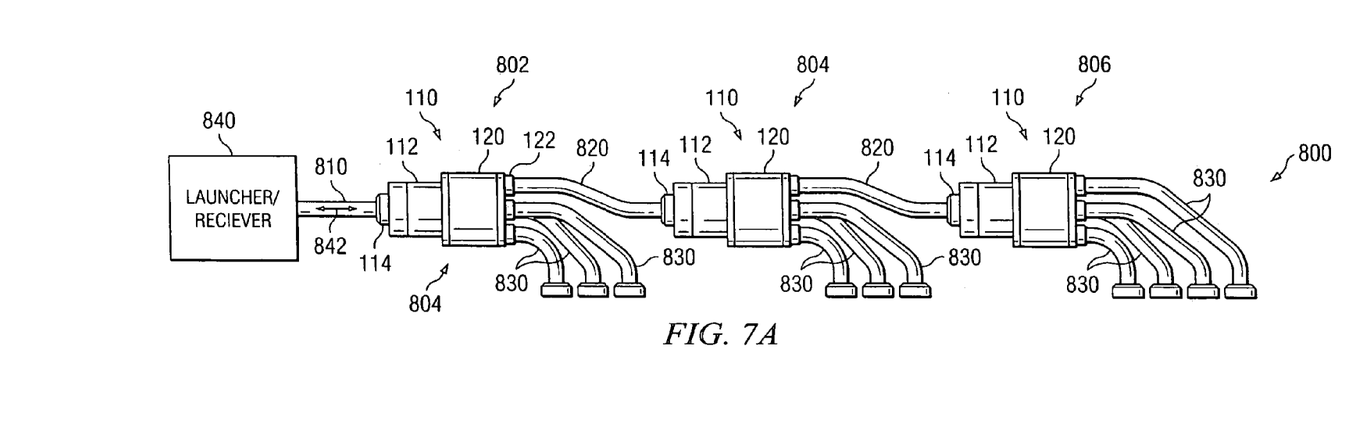
FIG. 7A is a multiple pipe line administration system that implements a series configuration.
Figure 7B:
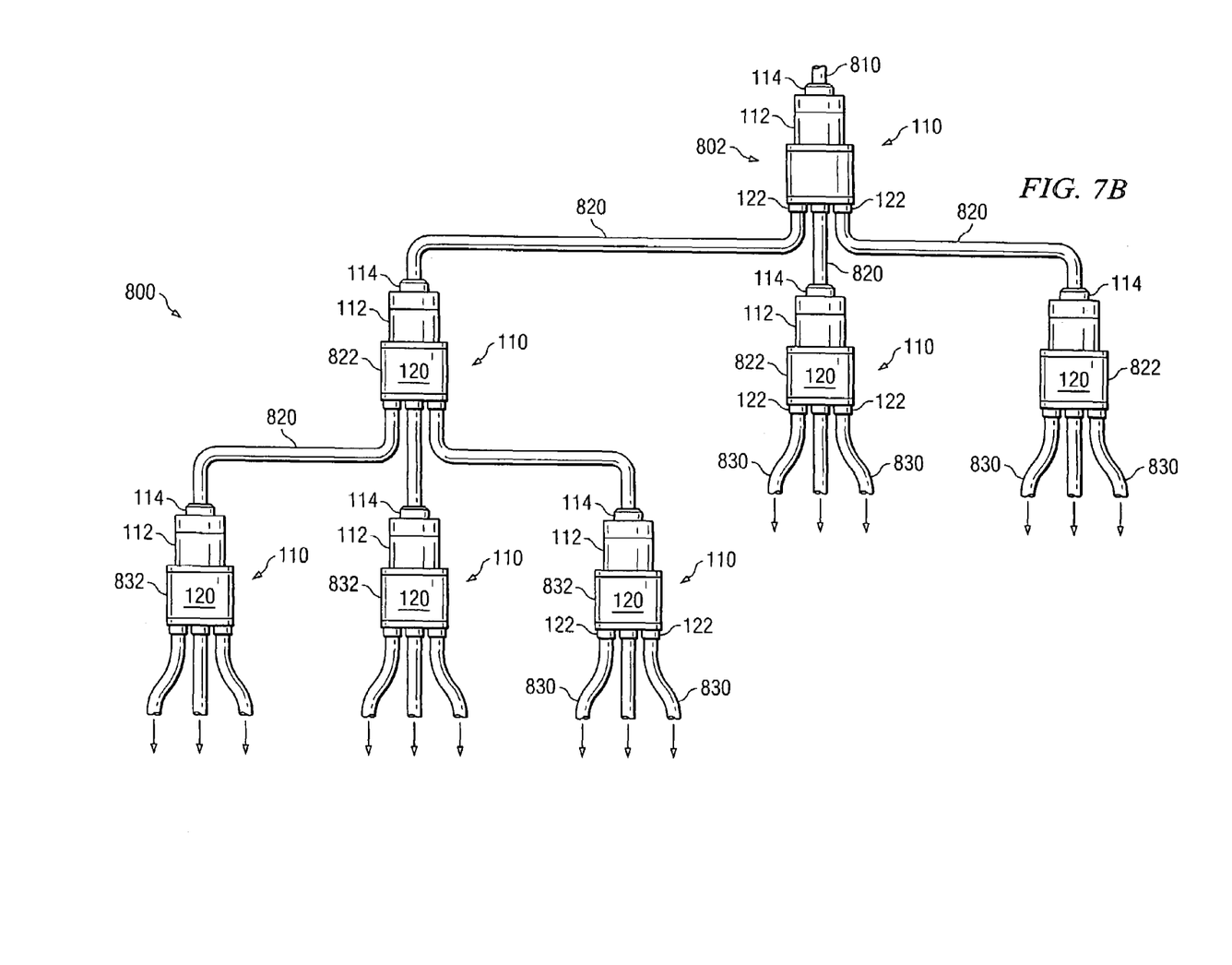
FIG. 7B is a multiple pipe line administration system that implements a parallel configuration.
Figure 7C:
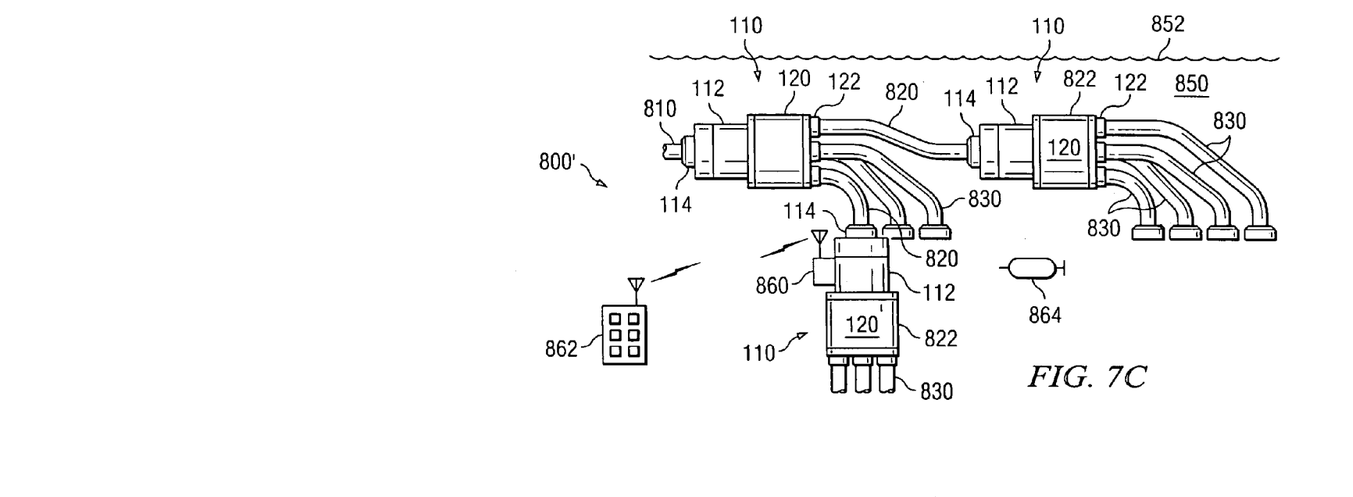
FIG. 7C is a multiple pipe line administration system that is adapted to operate below the surface of a body of water.

FIGS. 7A through 7C illustrate various implementations of a multi-port valve system for managing multiple pipe lines. Referring to FIG. 7A, a system 800 includes multiple multi-port valves 110 arranged in a series configuration. At least one of the valve systems, such as the illustrated launcher valve 802, may be coupled to a launcher/receiver 840 via a launcher/receiver line 810. Alternatively, the launcher valve 802 may be coupled to an alternative fluid source, such as a standard flow pump or other suitable fluid source. The launcher/receiver 840 may be operable to launch, receive, or launch and receive a pipeline scraper, also known as a pipe line pig, for use in cleaning pipe lines, or "lines" coupled thereto. In the implementation shown, the launcher line 810 is coupled to the inlet port flange 114 of the launcher valve 802. The launcher valve 802 includes various features similar to those discussed with respect to FIGS. 1A through 5B above, including a port selector disposed within the valve body 110 and adapted to rotate a flow path to communicate fluid or other matter between the inlet port flange 114 and one of the plurality of outlet ports 122.

A launcher line 810 couples the launcher/receiver 840 to the launcher valve 802. A pipeline scraper 842 may be adapted to proceed into the valve body 110 of the launcher valve 802 through the flow path disposed therein (not explicitly shown) to a selected outlet port 122 of the launcher valve 802.

Multiple lines may be coupled to the various outlet ports 122 of any of the valve systems 802, 804, or 806 illustrated by FIG. 7A. For example, a valve line 820 may be coupled to one of the plurality of outlet ports 122 of the launcher valve 802 and connect the launcher valve 802 via the pipe line 820 to the inlet port flange 114 of an additional down-line valve system 804 located down line from the launcher valve 802. Alternatively, a plurality of outlet pipe lines 830 may be coupled to the plurality of ports 122 that couple the outlet port 122 to a fluid destination. The fluid destination may be a wellbore, a pipe system, or other conduit system that requires cleaning by a pipeline scraper or similar device. Alternatively, for non-pipeline scraping applications, the fluid destination may be any suitable fluid destination, such as a tank, wellbore, underground reservoir, or other destination.

In the implementation illustrated by FIG. 7A, the plurality of valves, including the launcher valve 802 and the down line valves 804 and 806 are each connected in series. Thus, in operation, the launcher valve 802, which is coupled to the launcher/receiver 840 may receive and direct a pipeline scraper 842 from the launcher/receiver 840 to any of a number of fluid destinations. One example of a fluid destination is a down line valve 804 or 806. Each of the valves 802, 804 and 806 are illustrated with a valve line 820 coupling an outlet port of the previous valve to the inlet port flange 114 of a subsequent valve as the valve progresses away from the launcher/receiver 840. Therefore, any number of valves may be used, such that the number of fluid destinations using the system as illustrated in 800 could be unlimited.

FIG. 7B illustrates a system 800' in which a plurality of valves are operated in parallel. Similar to the valves illustrated in FIG. 7A, the valves illustrated in FIG. 7B incorporate similar features to those of the valve systems illustrated in FIGS. 1A through 5B. In operation, a line 810 couples a launcher/receiver valve 802 to a launcher/receiver, such as the launcher receiver 840 illustrated by FIG. 7A. Each of the outlet ports 122 may be coupled to the inlet port flange 114 of a subsequent valve 822, which is down line from the launcher/receiver valve 802. Thus, each of the valves 822 is operating in parallel in the system 800' illustrated by FIG. 7B. The pipeline scraper 842 as illustrated by FIG. 7A may operate within the system 800' of FIG. 7B based on the selected flow path position within the launcher/receiver valve 802 and/or the flow path or port selector position selected in each of the subsequent valves 822. As illustrated, system 800' also includes a third set of valves 832 operated in parallel down line from any one of the valves 822. Accordingly, each valve line 820 is adapted to connect a outlet port 122 of a preceding valve in the system 800' to a subsequent valve down line from the proceeding valve. Additionally, a plurality of lines 830 may be present on any one of the valves to couple one of the valves to a fluid destination. The valve lines 820 are valve-to-valve lines whereas the pipe lines 830 are valve-to-fluid destination lines.

FIG. 7C illustrates a valve system 800", which operates at least partially under the surface 852 of a body of water 850. Additionally, the system 800' illustrates a combination series and parallel configuration in which multiple valve lines 820 connect a single valve to the inlet port flange 114 of multiple down line valves 822. Accordingly, other lines 830 may connect the outlet ports 122 of the valves 802 or 822 of system 800' to fluid destinations. Additionally, a remote controlled actuator may be disposed within the valve body 110 of one or more of the valves 802 or 822 of system 800". Such a remote controlled actuator may also include a remote transceiver 862 operable to communicate with a valve transceiver 860 coupled to the valve 822, which may allow a user to manipulate the remote actuator from a location other than at the location of the valve 822. Alternatively, a remote operated vehicle or "ROV" may be used to manipulate the actuator at the valve location, to prevent individuals from having to go to the valve location under the surface 852 of the body of water 850.

In any of the systems illustrated in FIG. 7A through 7C, the valves may operate in either direction. For example, the launcher/receiver may either propel the scraper 842 from the launcher/receiver to a fluid destination, or if the flow is reversed within the system, the launcher/receiver 840 may receive the pipeline scraper 842 from the fluid destination, thus making the fluid destination a fluid source and the launcher/receiver 840 a receiver 840.

A number of embodiments of the invention have been described. Nevertheless, it will be understood that various modifications may be made without departing from the spirit and scope of the invention. For example, in any of the disclosed embodiments, the first and second directions of flow may be reversed, so that the outlet flow is reversed to be an inlet flow, and vice versa. Additionally, any of the valve configurations may incorporate welded ports, flanged ports, or any other suitable coupling device for production applications. Though only 3-way and 4-way valve systems were disclosed, it should be understood that any number of outlet ports or inlet ports may be incorporated without departing from the spirit and scope of the present invention. For example, there may be multiple outlet ports and multiple inlet ports, with the flow path including an outlet offset portion and an inlet offset portion so that multiple sources and destinations may use the same valve system. Accordingly, other embodiments are within the scope of the following claims.

What is claimed is:

1. A system for connecting multiple pipe lines, comprising:
    a multi-port selector valve having a valve body that comprises:
    an inlet port module with a body adapted to connect to a fluid source;
    an outlet port module having a body with at least two outlet ports, each of said outlet ports adapted to connect to an outlet fluid destination, wherein the outlet port module defines a sealed volume; and
    a port selector rotatably disposed in the sealed volume, said port selector being a rotatable member having a flow path there through, said flow path having:
        a path inlet having a first flow direction;
        a path outlet, said path outlet has a second flow direction substantially parallel to said first flow direction; and
        an offset portion disposed there between, said offset portion has a longitudinal flow direction with an angle of less than 90 degrees to the first flow direction, wherein the port selector is configured to rotate about an axis that extends through the path inlet;
    wherein the inlet port module comprises another sealed volume, which is sealed from the sealed volume of the outlet port module.

2. system of claim 1, wherein the multi-port selector valve is coupled to a petroleum well.

3. The system of claim 1, wherein:
    the path inlet of the flow path is generally linear and disposed in the sealed volume of the inlet port module; and
    both the path outlet and the offset portion of the flow path are disposed in the sealed volume of the outlet port module.

4. The system of claim 1, wherein the port selector is disposed entirely in the sealed volume of the inlet port module, the sealed volume of the outlet port module, or both.

5. The system of claim 1, wherein a portion of the port selector in which the offset portion of the flow path is disposed defines a generally conical shape.

6. system of claim 1, wherein the port selector seals against the valve body both near each end of the port selector and near an intermediate portion of the port selector.

7. A system for connecting multiple pipe lines, comprising:
    a plurality of multi-port valves, each valve including
        a valve body including:
            an inlet port module having a body with at least two inlet ports, each of said inlet ports adapted to connect to a fluid source, the inlet port defining a plurality of openings;
            an outlet port module having a body adapted to connect to an outlet fluid destination; and
            a port selector rotatably disposed in the valve body and having a generally rotationally-symmetric exterior, said port selector having a flow path there through, said flow path including:
                a path inlet;
                a path outlet about which the port selector is configured to rotate; and
                an offset portion disposed there between, wherein the inlet path has a first flow direction, the outlet portion has a second flow direction substantially parallel to the first flow direction, and said offset portion has a longitudinal flow direction with an angle of less than 90 degrees to the second flow direction; and
        an inlet valve line adapted to connect one of the at least two inlet ports of a first valve of the plurality of valves to the outlet port of another of the plurality of valves:
        wherein the port selector extends through a sealed volume of the inlet port module that houses the offset portion of the flow path.

8. The system of claim 7, wherein one of the plurality of valves comprises a receiver valve, the receiver valve coupled to a pig and adapted to communicate a pig from a fluid source to the receiving device.

9. The system of claim 7, wherein at least one of the plurality of valves includes a remote actuator, the remote actuator operable to rotate the port selector within the valve body of the valve.

10. The system of claim 9, wherein at least one of the plurality of valves is adapted to operate beneath the surface of a body of water.

11. The system of claim 9, wherein the remote actuator comprises a valve transceiver and a remote transceiver, the valve transceiver adapted to receive an instruction from the remote transceiver and communicate the instruction to the remote actuator.

12. The system of claim 11, wherein the remote transceiver and the valve transceiver are configured to communicate using a wireless signal.

13. The system of claim 9, wherein the remote actuator is coupled to a transmitter by a wired connection, the wired connection adapted to communicate an actuation instruction to the remote actuator via the wired connection.

14. The system of claim 7, wherein all but one of the plurality of valves includes the valve line coupled to the at least one inlet port.

15. The system of claim 10, wherein the port selectors are operable to rotate the flow path to allow communication between the path inlet and one of the at least two inlet ports by a remote operate vehicle.

16. The system of claim 7, wherein at least one of the plurality of valves is adapted to operate in reverse, such that matter may be transmitted from one of the at least two inlet ports to the outlet port.

17. A valve system, comprising:
first and second valves, each valve comprising:
an inlet port;
a plurality of outlet ports; and
a rotatable flow path having:
an inlet portion in fluid communication with the inlet port,
an outlet portion configured to fluidly communicate with each of the outlet portions depending on the angular position of the rotatable flow path; and
an offsetting portion disposed between the inlet portion and the outlet portion wherein the offsetting portion is disposed entirely in a sealed volume in which it is configured to rotate,
wherein the inlet portion is generally parallel with the outlet portion and the offsetting portion is at an angle of less than 90 degrees to the inlet portion; and
wherein the inlet port of the second valve is in fluid communication with an outlet port selected from among the plurality of outlet ports of the first valve;
a seal disposed about the inlet portion of the rotatable flow path near where the inlet portion meets the offsetting portion; and
wherein the inlet portion of each valve is generally coaxial with a central longitudinal axis about which the rotatable flow path is configured to rotate.

18. The valve system of claim 17, wherein the inlet portion of each valve is generally coaxial with a central longitudinal axis about which the rotatable flow path is configured to rotate.

19. The valve system of claim 17, wherein, for each valve, a flow path from the inlet port to an outlet port selected from among the plurality of outlet ports is generally free of turns that are greater than or substantially equal to 90 degrees.

20. The system of claim 17, wherein the inlet portion is disposed in a sealed yoke that is sealed from the sealed volume in which the offsetting portion is configured to rotate.

21. A system for connecting multiple pipe lines, comprising:
a multi-port selector valve having a valve body that comprises:
an inlet port module with a body adapted to connect to a fluid source;
an outlet port module having a body with at least two outlet ports, each of said outlet ports adapted to connect to an outlet fluid destination, wherein the outlet port module defines a sealed volume; and
a port selector rotatably disposed in the sealed volume, said port selector being a rotatable member having a flow path there through, said flow path having:
a path inlet having a first flow direction;
a path outlet, said path outlet has a second flow direction substantially parallel to said first flow direction; and
an offset portion disposed there between, said offset portion has a longitudinal flow direction with an angle of less than 90 degrees to the first flow direction, wherein the port selector is configured to rotate about an axis that extends through the path inlet, wherein the port selector seals against the valve body both near each end of the port selector and near an intermediate portion of the port selector.

22. A valve system, comprising:
first and second valves, each valve comprising:
an inlet port;
a plurality of outlet ports; and
a rotatable flow path having:
an inlet portion in fluid communication with the inlet port,
an outlet portion configured to fluidly communicate with each of the outlet portions depending on the angular position of the rotatable flow path; and
an offsetting portion disposed between the inlet portion and the outlet portion wherein the offsetting portion is disposed entirely in a sealed volume in which it is configured to rotate,
wherein the inlet portion is generally parallel with the outlet portion and the offsetting portion is at an angle of less than 90 degrees to the inlet portion, wherein the inlet portion is disposed in a sealed yoke that is sealed from the sealed volume in which the offsetting portion is configured to rotate; and
wherein the inlet port of the second valve is in fluid communication with an outlet port selected from among the plurality of outlet ports of the first valve; and
wherein the inlet portion of each valve is generally coaxial with a central longitudinal axis about which the rotatable flow path is configured to rotate.

* * * * *